United States Patent [19]

Jung et al.

[11] Patent Number: 5,632,898
[45] Date of Patent: May 27, 1997

[54] METHOD FOR REMOVING UNREACTED ELECTROPHILES FROM A REACTION MIXTURE

[75] Inventors: Michael E. Jung, Los Angeles; Phillip D. Cook, Vista; Andrew M. Kawasaki, Oceanside, all of Calif.

[73] Assignee: ISIS Pharmaceuticals, Inc., Carlsbad, Calif.

[21] Appl. No.: 696,054

[22] Filed: Aug. 13, 1996

[51] Int. Cl.$^6$ ........................................... C02F 1/42
[52] U.S. Cl. .................. 210/656; 210/668; 210/669; 210/681; 210/683; 210/692
[58] Field of Search ........................... 210/681, 683, 210/690, 691, 692, 669, 656, 668

[56] References Cited

U.S. PATENT DOCUMENTS

| | | | |
|---|---|---|---|
| 3,808,166 | 4/1974 | Bruzzone et al. | 210/692 |
| 3,961,034 | 6/1976 | Bostian et al. | 423/181 |
| 4,486,313 | 12/1984 | Meitzner et al. | 210/681 |
| 4,604,210 | 8/1986 | Lin | 210/690 |
| 4,752,638 | 6/1988 | Nowinski et al. | 525/54.1 |
| 4,952,291 | 8/1990 | Drysdale et al. | 204/157.93 |
| 5,300,685 | 4/1994 | Scates et al. | 562/608 |
| 5,543,055 | 8/1996 | O'Neill et al. | 210/638 |

OTHER PUBLICATIONS

Lowry T.H. and Richardson K.S. "*Mechanism and Theory in Organic Chemistry*", Third Edition; Harper Collins Publishers, pp. 367–373, 1987.

Curran D.P. and Hadida S. "Tris(2(perfluorohexyl)ethyl)tin Hydride: A New Fluorous Reagent for Use in Traditional Organic Synthesis and Liquid Phase Combinatorial Synthesis", *J. Am. Chem. Soc.*, 118:2531–2532, 1996.

Curran D.P. and Hoshino M. "Stille Couplings with Fluorous Tin Reactants: Attractive Features for Preparative Organic Synthesis and Liquid–Phase Combinatorial Synthesis", *J. Org. Chem.*, 61:6480–6481, 1996.

Curran D.P. "Combinatorial Organic Synthesis and Phase Separation: Back to the Future", *Combinatorial Chemistry/Chemtracts–Organic Chemistry*, pp. 75–87, Mar./Apr. 1996.

*Primary Examiner*—Cynthia L. Nessler
*Attorney, Agent, or Firm*—Woodcock Washburn Kurtz Mackiewicz & Norris

[57] ABSTRACT

Simple and efficient methods for scavenging excess electrophiles from a reaction mixture are provided utilizing addition of water soluble nucleophiles or solid support bound nucleophiles. Resulting addition products are removed from reaction mixtures through convenient separation techniques.

14 Claims, No Drawings

METHOD FOR REMOVING UNREACTED ELECTROPHILES FROM A REACTION MIXTURE

FIELD OF THE INVENTION

This invention relates to methods for the removal of unreacted electrophiles from a reaction mixture.

BACKGROUND OF THE INVENTION

In a nucleophilic substitution reaction, unreacted electrophile must be removed from the reaction mixture prior to any subsequent reactions. Otherwise, unreacted electrophile will compete with the subsequent reactions resulting in the formation of undesired compounds.

Nucleophilic substitution reactions are well known per se and are described in *Advanced Organic Chemistry*, 4th ed., Jerry March, John Wiley & Sons, New York, N.Y., 1992, which is incorporated herein by reference. Typically, such reactions use an excess of reagent, often electrophile, and the excess or unreacted electrophile is removed by distillation, crystallization, chromatography, high pressure liquid chromatography (HPLC), medium pressure liquid chromatography (MPLC) or a combination thereof, before other nucleophilic substitution or other reactions are carded out. These traditional methods are generally labor intensive and can require many hours to effectively remove the excess electrophile.

When multiple nucleophilic substitution reactions are to be carried out, for example in a solution phase synthesis, it is evident that the removal of excess electrophile can utilize large amounts of time and be quite costly. Therefore, there is a great need for a simple, efficient and effective method for scavenging electrophiles from a reaction mixture.

SUMMARY OF THE INVENTION

The present invention provides simple and efficient methods for the scavenging of electrophiles from a reaction mixture containing unwanted electrophiles comprising:

adding to said reaction mixture a compound having the formula:

$$Q-R_1-Z(O)_n-O-M_1$$

wherein n is 1, 2 or 3;
Q is a nucleophile;
Z is C, P or S;
$M_1$ is hydrogen or a metal ion selected such that the subsequent compound is water soluble at room temperature;

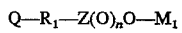

$R_1$ is $C_1-C_{10}$ hydrocarbyl;

in an amount sufficient to react with any remaining electrophile in said reaction mixture to form an addition compound; and separating the addition compound.

In one embodiment of the invention Q is $-NR_2R_3$, $-O-M_2$ or $-S-M_2$;
$M_1$ and $M_2$ are, independently, H, Na, K, Li or MgX;
X is a halide;
$R_1$ is $C_1-C_{10}$ alkyl, $C_3-C_{12}$ cycloalkyl, $C_6-C_{15}$ aryl, $C_7-C_{15}$ arylalkyl, or $C_7-C_{15}$ alkylaryl; and
$R_2$ and $R_3$ are, independently, hydrogen or $C_1-C_5$ alkyl.
In another embodiment of the invention n is 2;
Z is S;
Q is $-NR_2R_3$ or $-S-M_2$;
$M_1$ and $M_2$ are, independently, H, Na, K, or Li;
$R_1$ is $C_2-C_5$ alkyl; and
$R_2$ and $R_3$ are hydrogen.
In yet another embodiment of the invention n is 1;
Z is C;
Q is $-NR_2R_3$ or $-S-M_2$;
$M_1$ and $M_2$ are, independently, H, Na, K, or Li;
$R_1$ is $C_2-C_5$ alkyl; and
$R_2$ and $R_3$ are hydrogen.
In a further embodiment of the invention $M_1$ and $M_2$ are, independently Na or K; and
$R_1$ is ethylene, propylene or butylene.

In a preferred embodiment of the invention the separation step comprises partitioning the mixture into aqueous and organic layers. In another embodiment the separation step comprises adding to the organic layer an ion exchange resin capable of complexing with the addition compound followed by the separation of the ion exchange resin. In a further embodiment the separation step utilizes ion exchange column chromatography.

In another embodiment of the invention the separation step involves the addition of an ion exchange resin capable of complexing with the addition compound followed by the separation of the ion exchange resin. A preferred group of ion exchange resin includes Dowex 1x2-100, Dowex 1x2-200 and Dowex 1x2-400.

In one embodiment of the invention the reaction mixture is the result of the reaction of a plurality of nucleophiles and an electrophile. In a further embodiment the reaction mixture results from the reaction of a plurality of electrophiles and a nucleophile. In another embodiment the reaction mixture results from the reaction of a plurality of nucleophiles and a plurality of electrophiles. In an even further embodiment the reaction is under operational control of a computer.

The electrophile being scavenged is any unreacted electrophile that is present in the reaction mixture. An "electrophile" is a moiety which has an affinity for electrons.

DESCRIPTION OF PREFERRED EMBODIMENTS

The present invention describes a method for the rapid and efficient removal of unreacted electrophiles in a reaction mixture. In the context of the present invention, reaction mixture includes solution phase reaction mixture. Reaction mixtures having unreacted electrophiles are treated with a compound capable of reacting with the electrophile and enabling its removal from the reaction mixture. In a preferred embodiment of the invention, removal of unreacted electrophiles are effected by treatment of the reaction mixture with a compound of the invention followed by extraction of the reaction mixture with water.

In the context of this invention, an electrophile is an ion or molecule that takes part in an electrophilic process. In general an electrophilic reagent accepts an electron pair from a nucleophilic molecule with which it forms a covalent bond. Electrophilic reagents usually have a leaving group that is easily displaced during formation of a covalent bond with a nucleophile. Electrophiles may be neutral or positively charged. Exemplary electrophiles which can be removed from a reaction mixture by the present invention include alkyl halides, acid chlorides, alkyl tosylates, sulfonyl chlorides, acid anhydrides, carboxylate esters, alkyl mesylates, α-haloacetamides, isocyanates, aziridines, and similar species.

In one context a "leaving group" is a functional group attached to an electrophile which can be displaced by a nucleophile in a nucleophilic substitution reaction. Leaving groups are known per se (see for example *Advanced Organic Chemistry*, 4th ed, pages 205, 312, 501, 520–521, 569, 579–580, 642–667, 992–1008, Jerry March, John Wiley & Sons, New York, N.Y., 1992,). Exemplary leaving groups are halide, tosyl, mesyl, carboxylate, alkoxide, water, phosphate etc.

As used in the present invention the term "displaced" means a bond is broken. Thus, although a leaving group may be "displaced", it may still be attached to the addition compound by another covalent bond. For example, when an epoxide is used as an electrophile, an alkoxide is "displaced" by a nucleophile; however, the alkoxide residue remains attached to the newly formed addition compound, often becoming an alcohol function.

In the context of the present invention an "Addition compound" refers to a product which is formed in a nucleophilic substitution reaction between a nucleophile and an electrophile.

Compounds of the present invention represented by Formula I, herein referred to as nucleophilic reagents of the invention, react with unwanted electrophiles to form addition compounds that are easily removed from a reaction mixture.

In compounds of the present invention represented by Formula I, Q represents a nucleophile. A "nucleophile" is a species possessing one or more electron-rich sites, such as an unshared pair of electrons, the negative end of a polar bond or pi electrons. A nucleophile is also known as an electron donor. In a nucleophilic substitution reaction between a nucleophile and an electrophile, the nucleophile contributes an electron pair to form a new bond with the electrophile by displacing a leaving group from the electrophile. Nucleophiles may be neutral or negatively charged. In the present invention, preferred nucleophiles are amine, hydroxyl and thiol groups. More preferred nucleophiles are amine and thiol groups.

Hydroxyl and thiol groups comprising preferred nucleophilic reagents of the present invention may be protonated or complexed with a metal ion. Preferred metal ions for this purpose are sodium, lithium, potassium and magnesium halide ions. More preferred metal ions are sodium, lithium and potassium ions. If a hydroxyl or thiol group is protonated, it may be converted to an ion in situ using an appropriate base. Appropriate bases include potassium carbonate, lithium carbonate, sodium carbonate, sodium hydroxide, potassium hydroxide, lithium hydroxide, sodium hydride, potassium hydride, sodium bicarbonate, lithium bicarbonate, and alkyl lithiums such as methyl lithium and butyl lithium.

Amine nucleophilic moieties may be represented by the group $-NR_2R_3$ where $R_2$ and $R_3$ are hydrogen or $C_1$–$C_5$ alkyl. Preferably $R_2$ and $R_3$ are hydrogen.

In nucleophilic reagents of the invention Z is carbon, phosphorous or sulfur, and n is 1, 2 or 3. When Z is carbon then n is 1, i.e., carboxylic acid derivative. When Z is phosphorous then n is 2 or 3, i.e., it may be a phosphite or a phosphate derivative. When Z is sulfur then n is preferred to be 2, i.e., a sulfonate derivative. In a preferred embodiment of the present invention, Z is sulfur, and n is 2. $R_1$ is $C_1$–$C_{10}$ hydrocarbyl. Preferably, $R_1$ is $C_1$–$C_{10}$ alkyl, $C_3$–$C_{12}$ cycloalkyl, $C_6$–$C_{15}$ aryl, $C_7$–$C_{15}$ arylalkyl, or $C_7$–$C_{15}$ alkylaryl. More preferably, $R_1$ is $C_2$–$C_5$ alkyl. More preferably still, $R_1$ is $C_2$–$C_4$ alkyl.

Preferred nucleophilic reagents for use in connection with the present invention are those having formulas $M_2-S-(CH_2)_n-CO_2-M_1$, $H_2N-(CH_2)_n-CO_2M_1$, $M_2-S-(CH_2)_n-SO_3-M_1$ and $H_2N-(CH_2)_n-SO_3-M_1$, where n is 2 or 3, and $M_1$ and $M_2$ are independently hydrogen or sodium, lithium or potassium ion. Exemplary preferred compounds of the formula I include, 3-mereaptopropionic acid, 2-mercapto-1-ethane sulfonic acid sodium salt, 3-mercapto-1-propane sulfonic acid sodium salt and 2-aminoethane sulfonic acid which can be purchased from Aldrich Chemical Company (Milwaukee, Wis.).

In the present invention, a nucleophilic reagent is added to a reaction mixture containing unreacted electrophiles. The presence of unreacted electrophiles can be determined by thin layer chromatography (TLC), gas chromatography (GC), HPLC or other analytical methods readily apparent to those ordinary skilled in the art. The determination of the exact amount of unreacted electrophile is usually not necessary in accordance with the present invention.

For example, one may conveniently add an equal or excess molar amount of a nucleophilic reagent of the invention relative to the original amount of the electrophile added to the reaction mixture. In preferred embodiments, an excess of nucleophilic reagent of the invention is added to the reaction mixture.

After adding a nucleophilic reagent of the invention to the reaction mixture, it is allowed to react with the electrophile in the reaction mixture. The time required for sufficient reaction and, hence, the subsequent removal of the electrophile depends on many factors including reaction solvent, reaction temperature and the nature of the electrophile, however the time period is relatively short, usually on the order of a few minutes.

Generally, a nucleophilic substitution reaction occurs faster in a polar solvent such as ethanol, methanol, dimethylformamide and dimethylsulfoxide than in a relatively nonpolar solvent such as benzene, ether, tetrahydrofuran, chloroform and dichloromethane. Higher reaction temperatures generally increase the rate of nucleophilic substitution reaction and, hence the speed of reaction.

In addition, the nature of the electrophile also effects the rate of reaction. Generally, the reactivity of an electrophile is determined by the leaving group it possesses. The more stable a leaving group is as a free entity, the more easily the nucleophilic substitution reaction occurs. This is usually inverse to its basicity. Thus, the relative rate of reaction in alkyl halide is $I^->Br^->Cl^->>F^-$. That is, iodide ion which is the weakest base of halides, i.e. strongest conjugate acid, is the most reactive alkyl halide. Where as fluoride ion which is the strongest base of halides, i.e. weakest conjugate acid, is the least reactive alkyl halide.

Other factors also effect reactivity of an electrophile. For example, ring strain will greatly accelerate the rate of nucleophilic substitution reaction of an electrophile. Thus, although ordinary ethers are not cleaved by a nucleophile, except under extremely harsh conditions, epoxides which are cyclic ethers are cleaved quite easily by a nucleophile.

Steric hinderance of an electrophile also effects its rate of nucleophilic substitution reaction. A large steric bulk near the carbon bearing the leaving group will hinder approach of the nucleophile and decrease the reactivity of the electrophile. Thus, methyl iodide which has three small hydrogens around the carbon being the leaving group undergoes a nucleophilic substitution reaction much faster than isopropyl iodide which has one hydrogen and two methyl groups around the carbon bearing the leaving group.

Typically, one may follow the progress of the reaction between compounds of formula I and an electrophile using techniques which are readily apparent to those of ordinary skill in the art. Such techniques include, TLC, HPLC, GC, photoabsorbance, and others.

In one embodiment of the invention, after allowing a sufficient time for a nucleophilic reagent of the invention to react with an electrophile, the reaction mixture may be partitioned into aqueous and organic layers. Due to the water solubility of the nucleophilic reagent, any excess nucleophilic reagent will be substantially partitioned into the aqueous layer. The addition compound formed by the nucleophilic reagent and the electrophile will also be substantially soluble in water and, thus, may be removed with the removal of the aqueous layer. The organic layer may be separated and washed with additional water to further remove the addition compound. This washing of the organic layer with water may be repeated as many times as desired to ensure further removal of the addition compound. Typically, two or three washings of the organic layer with water will be sufficient to substantially remove of the addition compound.

As used in the present invention "removal" of a compound means that the amount of compound present is substantially reduced. Preferably, the amount of compound present in the reaction mixture is reduced by at least 90 molar percent. More preferably, the amount of compound present in the reaction mixture is reduced by at least 95 molar percent. Still more preferably, the amount of compound in the reaction mixture is reduced by at least 99 molar percent. Even more preferably, the amount of compound in the reaction mixture is reduced by at least 99.5 molar percent.

In another embodiment of the present invention, a separation step involves adding to the reaction mixture or the partitioned organic layer, an ion exchange resin which forms a complex with the addition compound. The resulting ion exchange resin is then removed from the solution. Separation methods include, but are not limited to, filtration and decantation.

In yet another embodiment of the present invention, a separation step involves ion exchange column chromatography of the reaction mixture or the organic layer using a suitable solvent. Suitable solvents for ion exchange chromatography include methanol, ethanol, water, dimethylformamide, dimethylsulfoxide, acetonitrile, ethyl acetate, ether, chloroform, toluene as well as other organic solvents and a combination thereof. Preferred solvents include methanol, ethanol, water, acetonitrile, dimethylformamide and a combination thereof.

Suitable ion exchange resins for the present invention include Amberlyst® A-21, Dowex® 1x2-100, Dowex® 1x2-200, Dowex® 1x2-400, Dowex® 1x8-50, Dowex® 1x8-100, Dowex® 1x8-200, and Dowex® 1x8-400. Preferably, ion exchange resin is selected from the group consisting of Dowex® 1x2-100, Dowex® 1x2-200 and Dowex® 1x2-400.

Preferred nucleophiles, Q, for use in the invention are amine, hydroxyl and thiol groups. More preferred nucleophiles are amine and thiol groups.

Amine nucleophilic moieties may be represented by the group —$NR_2R_3$ where $R_2$ and $R_3$ are independently hydrogen or $C_1$–$C_5$ alkyl. Preferably $R_2$ and $R_3$ are hydrogen.

The present invention is applicable to reactions involving nucleophiles and electrophiles as well as reactions involving a plurality of nucleophiles and/or a plurality of electrophiles.

Thus, the present invention is also applicable to combinatorial synthesis as well as traditional single compound synthesis. The present invention is also applicable to automated reactions controlled by a computer using an automated synthesizer.

Typically in a nucleophilic substitution reaction an excess of reagent, often electrophile, is used which must be removed from the desired products. A convenient method for the removal of unreacted electrophile has been developed wherein the electrophile is usually reacted with a conjugate base of a mercaptoalkanesulfonic acid which imparts water solubility to the addition compound. This allows for a simple aqueous workup which removes the addition compound.

In the following examples, THF refers to tetrahydrofuran and DMF refers to dimethylformamide.

Rotary evaporations were performed in vacuo (50 torr) at 35° C unless otherwise noted. NMR was performed on a Varian Geminii 200 or Varian Unity 400. Mass spectrometry were taken on a Hewlett Packard 59987A electrospray mass spectrometer (quadrupole mass analyzer 0–2600 amu).

THF, DMF, 2-mercapto-1-ethanesulfonic acid sodium salt, 3-mercapto-1-propanesulfonic acid sodium salt, 1-phenylpiperazine, diisopropylethylamine and 2-aminoethanesulfonic acid were obtained from Aldrich Chemical Company (Milwaukee, Wis.).

EXAMPLE 1

To demonstrate the effectiveness of the present invention, 2-bromo-N-[1'-(4'-methoxyphenyl)]acetamide (1) (Vloon, W. J., et al., *J. Med. Chem.* 1987, 30, 20–24.) was treated with an aqueous solution of 3-mercapto-1-propanesulfonic acid, sodium salt (2) and potassium carbonate to give a mixture of 2-(3'-propanesulfonic acid, sodium salt)-N-[1"-(4"-methoxyphenyl)]acetamide thioether (3) and (4).

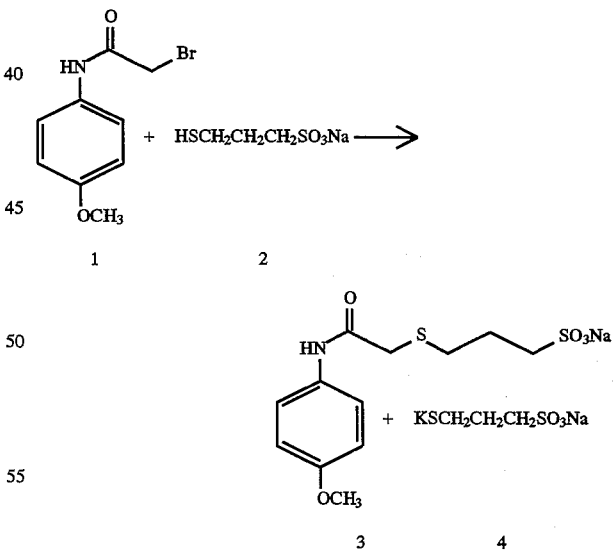

2-(3'-propanesulfonic acid, sodium salt)-N-(4"-methoxyphenyl)-acetamide thioether (3)

To a solution of 2-bromo-N-(4'-methoxyphenyl) acetamide (1) (244 mg. 1.0 mmol) in THF (5 mL) was added a freshly prepared solution of 3-mercapto-1-propanesulfonic acid sodium salt (2) (396 mg, 2.0 mmol) and potassium carbonate (276 mg, 2.0 mmol) in water (5 mL) at room temperature. The resulting biphasic solution was stirred for 30 min. The reaction mixture was diluted with ethyl acetate (20 mL), and the organic layer was separated, washed successively with water (2×5 mL) and brine (1×5 mL), dried over magnesium sulfate and concentrated to yield a residue (2 mg) of negligible mass. The aqueous layers were combined and concentrated to yield 2-(Y-propanesulfonic acid, sodium salt)-N-(4"-methoxyphenyl)-acetamide thioether (3) (550 mg) as a white solid. $^1$H NMR (Me$_2$SO-d$_6$): δ 7.48 (d, 2H), 6.88 (d, 2H), 3.72 (s, 3H), 3.25 (s, 2H), 2.74 (m, 4H), 2.55 (m,4H), 1.90 (m, 4H). Mass spectrum: 364 [M+Na$_2$]$^+$, 380 [M+NaK]$^+$, 396 [M+K$_2$]$^+$.

EXAMPLE 2

To confirm that the present invention did not cause undesired side-reactions, an excess (2 eq) of 2-bromo-N-(2'-benzothiazole)acetamide (5) (Yuan, J., Zhang, M., *Beijing Daxue Xuebao, Ziran Kexueban* 1988, 24, 504–506.) was treated with 1-phenylpiperazine (6) (1 eq) to provide 2-[4'-(1'-phenylpiperazine)]-N-(2"-benzothiazole) acetamide (8). The reaction mixture was treated with an aqueous solution of 2-mercapto-1-ethanesulfonic acid, sodium salt (7) and potassium carbonate. The organic layer yielded the desired compound 8 in 95% and the aqueous layer contained the addition compound 2-(2'-mercapto-1-ethanesulfonic acid, sodium salt)-N-(2"-benzothiazole) acetamide (9).

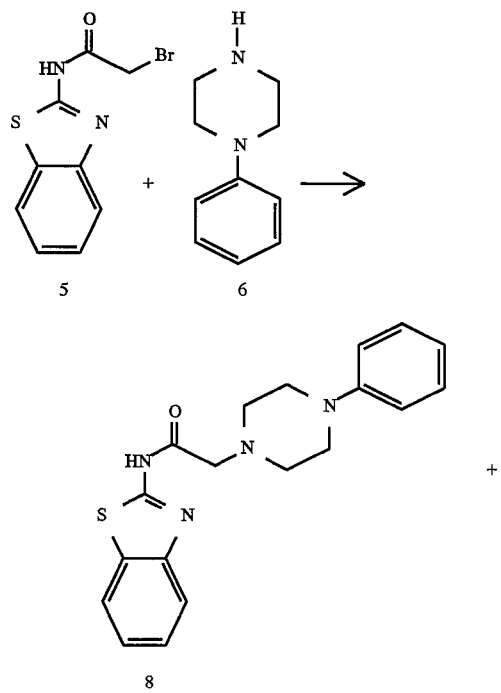

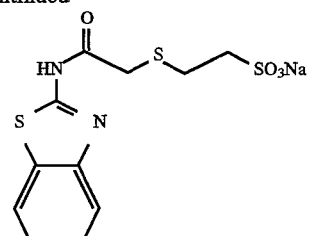

2-[4'-(1'-phenylpiperazine)]-N-(2"-benzothiazole) acetamide (8) and 2-(2'-mercapto-1-ethanesulfonic acid, sodium salt)-N-(2"-benzothiazole)acetamide (9).

To a solution of 2-bromo-N-(2'-benzothiazole)acetamide (5) (542 mg, 2.0 mmol) in THF (2.0 mL) and DMF (2.0 mL) was added 1-phenylpiperazine (6) (0.153 mL, 1.0 mmol) and diisopropylethylamine (0.209 mL, 1.2 mmol) at room temperature. The resulting solution was stirred for 1 hour, and a freshly prepared solution of 2-mercapto-1-ethanesulfonic acid, sodium salt (7) (328 mg, 2.0 mmol) and potassium carbonate (276 mg, 2.0 mmol) in water (5 mL) was added. The biphasic mixture was stirred for 30 min. The reaction mixture was diluted with ethyl acetate (20 mL), and the organic layer was separated, washed with water (2×5 mL) and brine (1×5 mL), dried over magnesium sulfate and concentrated to afford 2-[4'-(1'-phenylpiperazine)]-N-(2"-benzothiazole)acetamide (8) as a solid (334 mg, 95%). $^1$H NMR (Me$_2$SO-d$_6$): δ 12.16 (br, 1H), 8.00–7.24 (m, 4H), 7.20–6.73 (m, 5H), 3.41 (s, 2H), 3.16 (m, 4H), 2.69 (m, 4H). Mass spectrum: 353 (MH)$^+$, 375 (M+Na)$^+$. The aqueous layers were combined and concentrated to yield 2-(2'-mercapto-1-ethanesulfonic acid, sodium salt)-N-(2"-benzothiazole)acetamide (9) and 2-mercapto-1-ethanesulfonic acid, sodium salt (7) as a solid. $^1$H NMR (Me$_2$SO-d$_6$): δ 7.8–7.1 (m, 4H), 3.37 (s, 2H), 2.75 (m, 11 H). Mass spectrum: 377 [M+Na$_2$]$^+$, 393 [M+NaK]$^+$, 409 [M+K$_2$]$^+$.

EXAMPLE 3

In certain cases, the mercaptoalkanesulfonate adduct of a hydrophobic electrophile, e.g., 6-(bromoacetyl)-1,2,3,4-tetrahydro-1,1,4,4-tetramethylnaphthalene (12) results in a product, 6-[(2'-mercapto-1-ethanesulfonic acid, sodium salt) -acetyl]-1,2,3,4-tetrahydro-1,1,4,4-tetramethylnaphthalene (20), which partitions into the organic layer on aqueous workup. In such an event the hydrophobic sulfonate was separated from the desired products via anion-exchange resin chromatography subsequent to the aqueous workup. The proficiency of this invention is shown by synthesizing (20) as a pure compound then monitoring its presence or absence within a mixture of compounds.

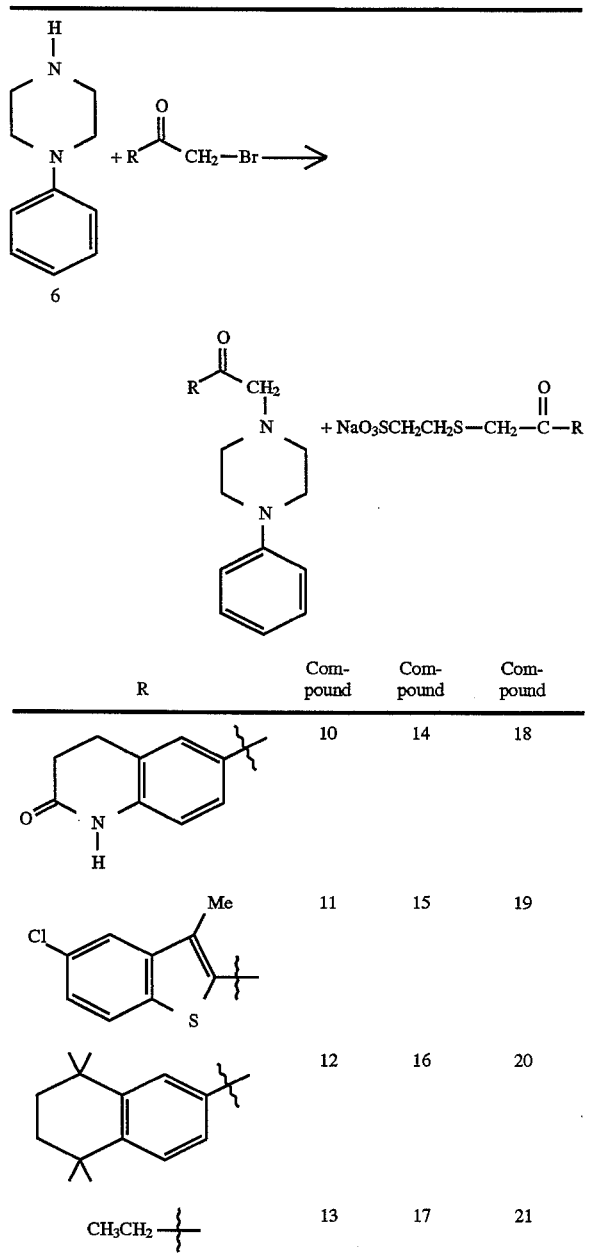

A. 6-[2'-mercapto-1'-ethanesulfonic acid, sodium salt) acetyl]-1,2,3,4-tetrahydro-1,1,4,4-tetramethylnaphthalene (20).

To a solution of 6-(bromoacetyl)-1,2,3,4-tetrahydro-1,1, 4,4-tetramethylnaphthalene (12) (15.5 mg, 0.050 mmol) in DMF (0.13 mL) and THF (0.13 mL) was added a freshly prepared solution of 2-mercapto-1-ethanesulfonic acid, sodium salt (2) (25 mg, 0.15 mmol) and potassium carbonate (21 mg, 0.15 mmol) in water (0.15 mL) at room temperature. The resulting biphasic mixture was stirred for 30 min. The reaction mixture was diluted with ethyl acetate (2.5 mL), and the organic layer was separated, washed with water (2×1 mL) and brine (1×1 mL), dried and concentrated to afford 6-[2'-mercapto-1'-ethanesulfonic acid, sodium salt)acetyl]-1,2,3,4-tetrahydro-1,1,4,4-tetramethylnaphthalene (20) as a solid. $^1$H NMR (pyr-d$_5$): δ 8.19, 7.90, 7.40 (m, 3H), 4.11 (s, 2H), 3.5 (m, 4H), 1.55 (s, 4H), 1.20 (d, 12H).

B. 6-[4'-(1'-phenylpiperazine)acetyl]-2-oxo-1,2,3,4,-tetrahydroquinoline (14), 2-[4'-(1'-phenylpiperazine)-acetyl]-5-chloro-3-methylbenzo[b]thiophene (15), 6-[4'-(1'-phenylpiperazine) acetyl]-1,2,3,4-tetrahydro-1,1,4,4-tetramethylnaphthalene (16), 4-[1'-(2'-butanonyl]-1-phenylpiperazine (17), and 6-[2'-mercapto-1'-ethanesulfonic acid, sodium salt)acetyl]-1,2,3,4-tetrahydro-1,1,4,4-tetramethylnaphthalene (20).

To a mixture of solution consisting essentially of 6-(boromoacetyl)-2-oxo-1,2,3,4,-tetrahydroquinoline (10) (274 mg, 1.02 mmol), 2-bromoacetyl)-5-chloro-3-methylbenzo[b]thiophene (11) (152 mg, 0.50 mmol), 6-(bromoacetyl)-1,2,3,4-tetrahydro-1,1,4,4-tetramethylnaphthalene (12) (322 mg, 1.04 mmol), and 1-bromo-2-butanone (13) (0.118 mL, 1.04 mmol) in DMF (10 mL) was added 1-phenylpiperazine (6) (0.076 mL, 0.50 mmol) and diisopropylethylamine (0.105 mL, 0.60 mmol) at room temperature. The reaction mixture was stirred for 1 hour, and a freshly prepared solution of 2-mercapto-1-ethanesulfonic acid, sodium salt (1.77 g, 10.8 mmol) and potassium carbonate (1.49 g, 10.8 mmol) in water (10 mL) was added. The resulting biphasic mixture was stirred for 30 min. The reaction mixture was diluted with ethyl acetate (50 mL), and the organic layer was separated, washed with water (2×5 mL) and brine (1×5 mL), dried over magnesium sulfate and concentrated to yield a solid material (407 mg). The solid residue was redissolved and reconcentrated using toluene (25 mL) and carbon tetrachloride (25 mL) to yield a mixture of 6-[4'-(1'-phenylpiperazine)acetyl]-2-oxo-1,2,3, 4,-tetrahydroquinoline (14), 2-[4'-(1'-phenylpiperazine) acetyl]-5-chloro-3-methylbenzo[b]thiophene (15), 6-[4'-(1'-phenylpiperazine)-acetyl]-1,2,3,4-tetrahydro-1,1,4,4-tetramethylnaphthalene (16), 4-[1'-(2'-butanonyl]-1-phenylpiperazine (17), and 6-[2'-mercapto-1'-ethanesulfonic acid, sodium salt)acetyl]-1,2,3,4-tetrahydro-1,1,4,4-tetramethylnaphthalene (20). $^1$H NMR (pyr-d$_5$): δ 4.12 (s, 6H, CH$_2$, compound 20), 3.94 (s, 2H), 3.90 (s, 2H), 3.68 (s, 2H), 2.45 (q, 2H).

Compound 20 was removed from the mixture via anion exchange chromatography (Dowex 1x2-200, Cl$^-$ form, 2×6 cm) by dissolving the mixture in DMF (5 mL) and eluting with methanol. Concentration of the eluent afforded a mixture of compounds 14, 15, 16, and 17 (161 mg) devoid of compound 20. $^1$H NMR (pyr-d$_5$): 6 3.94 (s, 2H), 3.90 (s, 2H), 3.68 (s, 2H), 2.45 (q, 2H). Mass spectrum 233 [M+H]$^+$, 350 [M+H]$^+$, 391 (M+H]$^+$.

Example 4

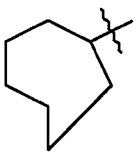

| R | Compound | Compound |
|---|---|---|
| 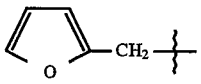 | 22 | 27 |
| 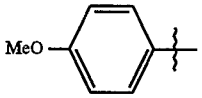 | 23 | 28 |
| 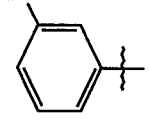 | 1 | 29 |
| 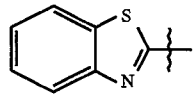 | 25 | 30 |
| 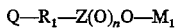 | 5 | 8 |

Further utility of the present invention is shown by a reaction employing an excess of five electrophiles wherein 1-phenylpiperazine (6) was reacted with a mixture of 2-bromo-N-cycloheptylacetamide (22), 2-bromo-N-furfuryl acetamide (23), 2-bromo-N-(4'-methoxyphenyl)acetamide (1), 2-bromo-N-(3-nitrophenyl)acetamide (25), and 2-bromo-N-(2'-benzothiazole)acetamide (5) to provide an equimolar mixture of 2-[4'-(1'-phenylpiperazine)]-N-(cycloheptyl)acetamide (27), 2-[4'-(1'-phenylpiperazine)]-N-(furfuryl)acetamide (28), 2-[4'-(1'-phenylpiperazine)]-N-(4-methoxyphenyl)acetamide (29), 2-[4'-(1'-phenylpiperazine)]-N-(3-nitrophenyl)acetamide (30), and 2-[4'-(1'-phenylpiperazine)]-N-(2"-benzothiazole)acetamide (8) devoid of alkylating agents after treatment with mercaptosulfonate 7.

2-[4'-(1'-phenylpiperazine)]-N-(cycloheptyl)acetamide (27), 2-[4'-(1'-phenylpiperazine)]-N-(furfuryl)acetamide (28), 2-[4'-(1'-phenylpiperazine)]-N-(4-methoxyphenyl)acetamide (29), 2-[4'-(1'-phenylpiperazine)]-N-(3-nitrophenyl)acetamide (30), and 2-[4'-(1'-phenylpiperazine)]-N-(2-benzothiazole)acetamide (8).

To a mixture of solution consisting essentially of 2-bromo-N-cycloheptylacetamide (22) (76.7 mg, 0.327 mmol), 2-bromo-N-furfurylacetamide (23) (66.4 mg, 0.304 mmol), 2-bromo-N-(4-methoxyphenyl)acetamide (1) (44.6 mg, 0.183 mmol), 2-bromo-N-(3-nitrophenyl)acetamide (25) (32.2 mg, 0.124 mmol), and 2-bromo-N-(2-benzothiazole)acetamide (5) (29.8 mg, 0.110 mmol) in DMF (2.0 mL) was added a solution of 1-phenylpiperazine (0.076 mL, 0.50 mmol) and diisopropylethylamine (0.105 mL, 0.60 mmol) in THF (3 mL) at room temperature. The reaction mixture was stirred for 1 hour, and a freshly prepared solution of 2-mercapto-1-ethanesulfonic acid, sodium salt (246 mg, 1.50 mmol) and potassium carbonate (207 mg, 1.50 mmol) in water (3.5 mL) was added. The resulting biphasic mixture was stirred for 30 min. The reaction mixture was diluted with ethyl acetate (25 mL), and the organic layer was separated, washed with water (2×5 mL) and brine (1×5 mL), dried over magnesium sulfate and concentrated to yield a solid material. The solid residue was redissolved and reconcentrated using toluene (25 mL) and carbon tetrachloride (25 mL) to afford a mixture of 2-[4'-(1'-phenylpiperazine)]-N-(cycloheptyl)acetamide (27), 2-[4'-(1'-phenylpiperazine)]-N-(furfuryl)acetamide (28), 2-[4'-(1'-phenylpiperazine)]-N-(4-methoxyphenyl)acetamide (29), 2-[4'-(1'-phenylpiperazine)]-N-(3-nitrophenyl)acetamide (30), and 2-[4'-(1'-phenylpiperazine)]-N-(2-benzothiazole)acetamide (8) as a solid (155 mg). $^1$H NMR (Me$_2$SO-d$_6$): δ 8.67 (m, 1H), 7.74 (d, 1H), 3.32 (s, 2H), 3.11 (s, 2H), 3.01 (s, 2H), 2.93 (s, 2H). Mass spectrum 317 [M+H]$^+$, 301 [M+H]$^+$, 327 [M+H]$^+$, 342 [M+H]$^+$, 354 [M+H]$^+$.

Other variations of the present invention include use of 2-aminoethanesulfonic acid (31) as the quenching reagent.

$$R—X+H_2NCH_2CH_2SO_3H \rightarrow H_2NCH_2CH_2SO_3^- \cdot ^+HNEt(ipr):$$

In the event that an aqueous workup must be avoided due to the hydrophilicitiy of desired products the addition compound may be removed by silica gel flash chromatography.

What is claimed is:

1. A method for scavenging an electrophile from a reaction mixture comprising:

adding to said reaction mixture a compound having the formula:

$$Q—R_1—Z(O)_nO—M_1$$

wherein n is 1, 2 or 3;

Q is a nucleophile;

Z is C, P or S;

$M_1$ is hydrogen or a metal ion selected such that said compound is water soluble at room temperature; and $R_1$ is $C_1$–$C_{10}$ hydrocarbyl;

in an amount sufficient to react with said electrophile in said reaction mixture to form an addition compound; and separating said addition compound from the reaction mixture.

2. The method of claim 1 wherein:

Q is —NR$_2$R$_3$, —O—M$_2$ or —S—M$_2$;

M$_1$ and M$_2$ are, independently, H, Na, K, Li or MgX;

X is a halide;

R$_1$ is C$_1$–C$_{10}$ alkyl, C$_3$–C$_{12}$ cycloalkyl, C$_6$–C$_{15}$ aryl, C$_7$–C$_{15}$ arylalkyl, or C$_7$–C$_{15}$ alkylaryl; and R$_2$ and R$_3$ are, independently, hydrogen or C$_1$–C$_5$ alkyl.

3. The method of claim 2 wherein:

n is 2;

Z is S;

Q is $-NR_2R_3$ or $-S-M_2$;

$M_1$ and $M_2$ are, independently, H, Na, K, or Li;

$R_1$ is $C_2-C_5$ alkyl; and $R_2$ and $R_3$ are hydrogen.

4. The method of claim 2 wherein:

n is 1;

Z is C;

Q is $-NR_2R_3$ or $-S-M_2$;

$M_1$ and $M_2$ are, independently, H, Na, K, or Li;

$R_1$ is $C_2-C_5$ alkyl; and $R_2$ and $R_3$ are hydrogen.

5. The method of claim 2 wherein:

$M_1$ and $M_2$ are, independently Na or K; and $R_1$ is ethylene, propylene or butylene.

6. The method of claim 1 wherein said separation step comprises partitioning said mixture into aqueous and organic layers.

7. The method of claim 6 wherein said separation step further comprises:

adding to said organic layer an ion exchange resin capable of complexing with said addition compound; and separating said ion exchange resin.

8. The method of claim 6 wherein said separation step further comprises ion exchange column chromatography.

9. The method of claim 1 wherein:

said separation step comprises:

adding to said reaction mixture an ion exchange resin capable of complexing with said addition compound; and separating said ion exchange resin.

10. The method of claim 1 wherein said separation step comprises ion exchange column chromatography.

11. The method of claim 1 wherein said reaction mixture is a reaction mixture resulting from the reaction of a plurality of nucleophiles and an electrophile.

12. The method of claim 1 wherein said reaction mixture is a reaction mixture resulting from the reaction of a plurality of electrophiles and a nucleophile.

13. The method of claim 1 wherein said reaction mixture is a reaction mixture resulting from the reaction of a plurality of nucleophiles and a plurality of electrophiles.

14. The method of claim 1 wherein said reaction is under operational control of a computer.

* * * * *

UNITED STATES PATENT AND TRADEMARK OFFICE
CERTIFICATE OF CORRECTION

PATENT NO. : 5,632,898
DATED : May 27, 1997
INVENTOR(S) : Jung et al.

It is certified that error appears in the above-identified patent and that said Letters Patent is hereby corrected as shown below:

Column 1, line 25, delete the word "carded" and insert therefor --carried--;
Column 2, line 60, delete the word "dining" and insert therefor --during--;
Column 4, line 7, delete "3-mereaptopropionic" and insert therefor --3-mercaptopropionic--;
Column 4, line 64, delete the word "being" and insert therefor --bearing--;
Column 10, line 20, delete the word "boromoacetyl" and insert therefor --bromoacetyl--;
Column 10, line 54, delete "6" and insert therefor--δ--;
Column 12, line 32, the compound should appear as follows:
"R-X + $H_2NCH_2CH_2SO_3H \longrightarrow H_2NCH_2CH_2SO_3^- \cdot {}^+HNEt(ipr)_2$"
                                           31

Signed and Sealed this

Twelfth Day of January, 1999

Attest:

Attesting Officer     *Acting Commissioner of Patents and Trademarks*